United States Patent [19]

Horibe et al.

[11] 4,099,019
[45] Jul. 4, 1978

[54] ELECTRIC FURNACE WASTE HEAT RECOVERY METHOD AND APPARATUS

[75] Inventors: Koichi Horibe; Minoru Watanabe; Tokuji Machida, all of Arai, Japan

[73] Assignee: Joetsu Denro Kogyo Co., Ltd., Arai-shi, Nigata, Japan

[21] Appl. No.: 777,912

[22] Filed: Mar. 16, 1977

[30] Foreign Application Priority Data

Aug. 24, 1976 [JP] Japan ................................. 51-100845
Sep. 8, 1976 [JP] Japan ........................... 51-120755[U]

[51] Int. Cl.² .......................... F27D 9/00; F27D 17/00
[52] U.S. Cl. ..................................... 13/9 R; 122/7 A; 266/241
[58] Field of Search ....................... 13/1, 9, 32, 31, 35, 13/14–17; 122/7 A; 266/241

[56] References Cited

U.S. PATENT DOCUMENTS

| 3,173,980 | 3/1965 | Hysinger | 13/31 X |
| 3,601,382 | 8/1971 | Sandri et al. | 122/7 A |
| 3,604,376 | 9/1971 | Meyer et al. | 13/9 X |
| 3,723,632 | 3/1973 | Beizerov | 13/32 |

Primary Examiner—R. N. Envall, Jr.
Attorney, Agent, or Firm—Blanchard, Flynn, Thiel, Boutell & Tanis

[57] ABSTRACT

Useful heat is recovered from electric furnaces using two heat recovery systems. Primary heat recovery is effected using liquid water or other cooling liquid and is performed in such a manner that the temperature of the liquid does not exceed its boiling point at atmospheric pressure. Secondary heat recovery is effected by indirect heat exchange between the exhaust gas of the furnace and a gaseous cooling medium and is performed in such a manner that the gaseous medium is heated to a temperature above the boiling point of the cooling liquid. A part or the entirety of the cooling liquid is then heated by the gaseous medium.

8 Claims, 1 Drawing Figure

U.S. Patent    July 4, 1978    4,099,019
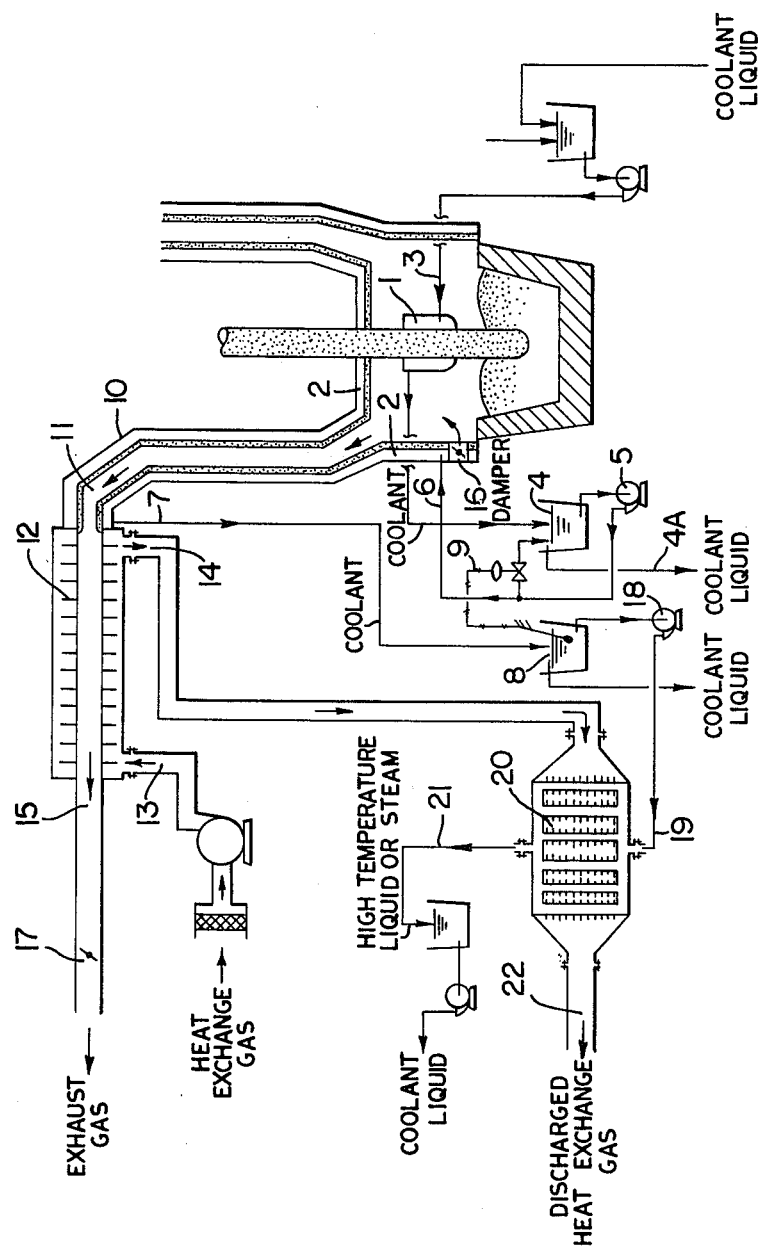

ELECTRIC FURNACE WASTE HEAT RECOVERY METHOD AND APPARATUS

BACKGROUND OF THE INVENTION

1. Field of the Invention

This invention relates to a method and an apparatus for recovering waste heat from electric furnaces whose exhaust gases have a high dust content or are strongly corrosive at relatively low temperatures. The recovery of waste heat from such furnaces has been very difficult with the conventional techniques.

2. Description of the Prior Art

Various devices have been proposed heretofore for recovering waste heat from varous kinds of electric furnaces such as carbide furnaces, ferroalloy furnaces and electric smelting furnaces. In this context, the recovery of waste heat does not mean simply cooling the furnace to prevent overheating of structural parts or for other operational purposes, but rather means recovering useful heat that would otherwise be lost.

Among the attempts for heat recovery employed in the past there are, for example, a method in which the hightemperature atmosphere zone (which may reach a temperature of several hundred degrees centigrade) in the upper portion of the electric furnace is invested by a water-cooled double wall structure and the used cooling water is heated to a temperature of over 100° C whereby the heat is recovered in the form of hot water or steam, and a method in which dust-laden waste gas having a temperature of several hundred degrees centigrade is introduced directly into a hot water generator or steam generator.

According to these methods, however, the temperature of the electric furnace discharge gas fluctuates widely when the internal pressure of the waste heat recovering device is kept lower than atmospheric pressure, and particularly in the case of a blowing-in type of furnace, the exhaust gas temperature tends to rise sharply. For these reasons, the temperature of the recovered cooling water is usually lowered to on the order of 40° to 50° C, resulting in the recovery of an extremely low quantity of useful heat. In order to increase the quantity of useful heat recovered, the internal pressure of the recovery device must be kept higher than atmospheric pressure, but in such a case, proper maintenance and management for safe operaton of the device become very troublesome and also such apparatuses are subject to various legal regulations and controls relating to "boilers" or "pressure vessels." Therefore, periodic shutdown of the furnace is required for maintenance and inspection of the waste heat recovering apparatus, resulting in substantially reduced production of the electric furnace itself.

Another difficulty is that the dust contained in exhaust gas is generally very liable to adhere to the structural parts and because this dust has poor heat conductivity, it is required that the heat transfer area of the waste heat recovery apparatus be increased, thereby resulting in an enlarged size of the apparatus as a whole. If a multitubular heat exchanger or the like is employed for reducing the general size of the apparatus, largescale and expensive equipment and troublesome operations are required for removing the dust which builds up heavily in such heat exchanger or the like.

The present invention provides a waste heat recovering apparatus which is free of the aforementioned disadvantages of the prior art and is capable of maximizing the recovery of useful heat without reducing the production capacity of the electric furnace itself.

More specifically, the waste heat recovering apparatus according to the present invenion, which is designed for use in conjunction with electric furnaces of the type that discharge high-temperature gas laden with a large amount of dust, employs primary heat recovery using water or other cooling liquid at a temperature below the boiling point thereof and under atmospheric pressure, and secondary heat recovery practiced by passing the dust-laden discharge gas, after primary heat recovery, through a hollow structure whose internal surfaces are of such nature as to repel adhesion of dust thereto and/or to allow easy removal of any dust that may be deposited thereon, while simultaneously passing air or other gas as a heat exchange medium along the opposite side wall at a temperature higher than the boiling point of water. The invention is further characterized by the fact that the entirety or part of the water or other liquid which has undergone said primary heat recovery is heated with air or other gaseous medium which has undergone the secondary heat recovery by using a heat exchanger or boiler, whereby to obtain a high-temperature liquid or steam.

BRIEF DESCRIPTION OF THE DRAWING

The drawing is a schematic view of the embodiment of the invention.

The invention will now be described in more detail with reference to the accompanying drawing and in relation with the problems involved in the prior art apparatuses.

In the drawing, reference numerals 1 to 10 are applied to the component parts of the primary heat recovery section, reference numerals 11 to 17 identify the component parts of the secondary heat recovery section, and reference numerals 18 to 22 identify the parts of the final heat recovery section. More particularly, reference numeral 1 indicates an internal structural part of the furnace which is directly cooled, such as the electrode cladding. 2 is a hood or furnace cover and 10 is a discharge gas conduit in the furnace cover. The parts 2 and 10 are protected by layers of heat insulation and they cooled with water or other liquid that flows in heat exchange relation to the heat insulation. The cooling liquid is supplied to porion 1 through the conduit 3 by means of a pump. In order to elevate the discharge temperature of the water or other cooling liquid, the water or other liquid which has been used to cool the directly cooled portion 1 is flowed into a collector tank 4 which is open to the atmosphere, and the entirety or part of such liquid in tank 4 is further passed by operation of pump 5 through the conduit 6 and thence into the insulated portions 2 and 10. The flow of the water or other cooling liquid is controlled by a temperature and flow controller 9. The controller 9 is adapted to open a valve to recycle the liquid to the tank 4 and tank 4 has an overflow 4a to discharge excess liquid therein. After the water or other cooling liquid has cooled portions 2 and 10, it is flowed through conduit 7 into another collector tank 8 which is also open to the atmosphere. The controller 9 has means for sensing the temperature of the liquid in tank 8.

In using such water or other cooling liquid, there are involved the problems of the strength of the mechanical parts so as to withstand localized overheating or rise of internal pressure caused by vaporization of said liquid as it flows through the various pasages and the accessibility thereof for maintenance, inspection and repair. In order to solve these problems, there generally has been employed a hot-water boiler system using water having a temperature higher than its boiling point under atmospheric pressure or a steam boiler system using steam for heat recovery in the troublesome portions. However, there still remain many problems to be solved in order to achieve fully practical use of these systems. For example, troubles tend to arise from localized overheating, particularly in the complicated electrode cladding cooling unit 1, and there also exist the practical problems concerning legal regulations on the use of boilers or "pressure vessels". Further, a cooling system using a cooling medium other than water, such as air, cannot satisfactorily cope with a quick rise of temperature caused by blowing or radiant heat of the furnace wall, which may reach close to 1000° C, because of the low specific heat of such gaseous cooling medium or for other reasons.

According to the apparatus of this invention, the heat emanating from such portions is recovered by controlling the temperature of the cooling liquid circulating through parts 1 to 10 so that its normal maximum level is below the boiling point of water or other cooling liquid employed, under atmospheric pressure, or it is recovered at a temperature as close to the boiling point as possible, but within the range that is free of any operational safety problem, for maximizing useful heat recovery by elevating the discharge temperature. In this invention, this operation constitutes the primary heat recovery step. In order to keep the temperature of the cooling liquid as close to the boiling point as possible, the entirety or part of the effluent fluid from the directly cooled portion 1 is further passed through the sections 2 and 10 which are protected by layers of heat insulation. These insulated sections 2 and 10, owing to the heat capacity of the heat insulation, function to alleviate and even off the temperature change caused by a rapid rise of the temperature of the discharge gas or the furnace wall during blowing or other operations, so that the efflux temperature of the cooling liquid in these portions can be controlled with ease and safety by the temperature and flow regulator 9.

As the second stage of heat recovery, the stream 11 of dust-laden gas leaving conduit 10, which has undergone primary heat recovery, is passed through the internal tube or tubes of a heat exchanger 12 wherein the internal wall of said tube is made of a heat-proof steel plate and has a circular or square shape so as to minimize adhesion of dust and to allow easy removal of dust if it does deposit thereon. Simultaneously, a stream 13 of air or other gaseous heat exchange fluid containing little or no dust is flowed by a fan, as a heat exchange medium along the outer side (shell side) of said heat exchanger. The air or other fluid 13 is heated in the heat exchanger to a temperature higher than the boiling point of the liquid in tank 8 and it is discharged at 14. The stream 15 of electric furnace discharge gas is lowered to a temperature level at which the discharge gas dust collector (not shown) and other means can be operated effectively but which is higher than the temperature at which said discharge gas exhibits a serious corrosion effect. Secondary heat recovery is accomplished in this way.

There have been devised several systems such as hot water boiler systems or steam boiler systems for heat recovery in said portion or the sections including the discharge gas conduit 10 and heat exchanger 12, but these known systems are accompanied by various troubles resulting from loading caused by deposition of dust on the gas discharge side inner wall of the electric furnace as mentioned above. Also, because it is required to elevate the discharge gas temperature above the level at which it causes appreciable corrosion, the temperature of the boiler side heating medium is also increased whereby to cause elevation of the internal pressure, which in turn causes problems of safety and ease of operation.

The present invention has succeeded in overcoming these difficulties by employing a heat exchanger which utilizes air or other gaseous fluid substantially free of dust as the heat exchange medium in the heat exchanger 12. The heat exchanger is constructed of an externally finned, large-diameter, central tube of the type which repels adhesion of dust or allows easy removal of dust deposition if any occurs. These means and arrangements satisfy the requirements for safety and ease of operation and also allow for maintenance of the discharge gas temperature above the level at or below which corrosion can take place.

Further, control of the temperature of the furnace discharge gas 11 at a level optimum for safe and proper operation of the heat exchanger 12 can be accomplished with ease by adjusting a damper 16 provided in the suction pipe system from the furnace cover 2 or by adjustng a damper 17 provided in the discharge duct for the furnace discharge gas 15.

The water or other cooling liquid in tank 8, which has a temperature below or close to its boiling point under atmospheric pressure, as above described, is fed by pump 18 through conduit 19 into a heat exchanger or boiler 20. The water or other cooling liquid is heated in heat exchanger or boiler 20 by the air or other gas exiting from heat exchanger 12, which gas has undergone secondary heat recovery and has a temperature higher than the boiling point of water, thereby achieving the desired high heat recovery by transforming the liquid from tank 8 into a high-temperature liquid or steam with a large useful heat value. The high temperature liquid or steam exits from 20 via conduit 21. The gas is discharged through conduit 22.

Further, because this heat exchanger 20 remains substantially free of fouling, it is possible to employ a type which is of simple structure and high in heat recovering efficiency. Moreover, because clean air or other fluid is used as heat exchange medium, the discharge gas flow 22 which has undergone heat exchange can be recycled for repeated use.

As described above, the waste heat recovering device according to this invention is capable of comprehensively recovering waste heat from electric furnaces with safety and ease, which recovery has been considered quite difficult with the conventional techniques.

The embodiments of the invention in which an exclusive property or privilege is claimed are defined as follows:

1. In an electric furnace that discharges a high temperature exhaust gas laden with dust, said furnace comprising electrode means having first cooling means associated therewith, a cover having conduit means for discharging the exhaust gas from the furnace and having second cooling means associated with said conduit means, means for circulating a first liquid coolant through said first and second cooling means for cooling said electrode means and said conduit means whereby to discharge said first coolant in a heated liquid state under atmospheric pressure; a first heat exchanger having internal tube means connected to said conduit means for receiving exhaust gas therefrom, said internal tube means being constructed so as to repel adhesion of dust present in said exhaust gas and so as to be easily cleanable if dust is deposited thereon, said first heat exchanger including means to circulate a second gaseous coolant in indirect heat exchange relationship with said internal tube means whereby to discharge from said first heat exchanger a stream of second gaseous coolant heated to a temperature higher than the boiling point of said first coolant; and a second heat exchanger connected to receive and to effect heat exchange between said first coolant and said second coolant whereby said first coolant is heated to a higher temperature.

2. An electric furnace according to claim 1 wherein said first heat exchanger is a shell-and-tube heat exchanger wherein the tube means have fins projecting from the external surface thereof.

3. An electric furnace according to claim 2 wherein said tube means of said first heat exchanger are internally unobstructed, straight and of constant internal size throughout their length.

4. An electric furnace according to claim 2 including fan means for circulating a stream of said second coolant through the shell side of said first heat exchanger.

5. An electric furnace according to claim 1 wherein said second heat exchanger comprises a shell-and-tube heat exchanger, and including means for circulating one of said coolants through the shell side thereof and means for circulating the other of said coolants through the tube side thereof.

6. An electric furnace according to claim 1 including a vessel for receiving said first coolant in the liquid state, under atmospheric pressure, after said first liquid has circulated through said first and second cooling means and pump means for pumping said first coolant from said vessel into said second heat exchanger.

7. An electric furnace according to claim 6 including a second vessel connected for receiving said first coolant from said first cooling means, second pump means for pumping said first coolant from said second vessel through said second cooling means and thence into said first vessel and means for controlling the rate of flow of the first coolant from said second vessel to said first vessel.

8. A process for recovering waste heat from an electric furnace that discharges a high-temperature exhaust gas having high dust loading, which comprises the steps of: in a primary heat recovery stage, flowing a relatively cool, heat-exchange liquid in indirect heat-exchange relationship with the high-temperature exhaust gas discharged from said furnace so that said heat-exchange liquid removes heat from the exhaust gas whereby to partially cool the exhaust gas and to effect primary heat recovery therefrom, and thereby heating said heat-exchange liquid to a temperature lower than the boiling point thereof under atmospheric pressure, and then discharging said heated heat-exchange liquid from said primary heat recovery stage into an atmospheric pressure zone; in a secondary heat recovery stage, flowing the partially cooled exhaust gas through tube means constructed to repel adhesion of dust and to permit easy removal of any dust deposited thereon and simultaneously passing a relatively cool heat-exchange gas along the opposite side of said tube means indirect heat-exchange relationship with the exhaust gas so that said heat-exchange gas removes heat from the exhaust gas and is heated to a temperature higher than the boiling point of said heat-exchange liquid, and discharging said heated heat-exchange gas from said secondary heat recovery stage; and in a final heat recovery stage, flowing said heat-exchange liquid from said atmospheric pressure zone in heat-exchange relationship with said heat-exchange gas that was discharged from said secondary heat recovery stage, whereby to raise the temperature of said heat-exchange liquid.

* * * * *

UNITED STATES PATENT OFFICE
CERTIFICATE OF CORRECTION

Patent No. 4,099,019              Dated July 4, 1978

Inventor(s) Koichi Horibe et al.

It is certified that error appears in the above-identified patent and that said Letters Patent are hereby corrected as shown below:

Column 6, line 28, after "means" insert -- in --.

Signed and Sealed this

Twenty-sixth Day of December 1978

[SEAL]

Attest:

RUTH C. MASON
*Attesting Officer*

DONALD W. BANNER
*Commissioner of Patents and Trademarks*